United States Patent [19]
Collard et al.

[11] 4,108,562
[45] Aug. 22, 1978

[54] RELEASABLE COUPLING

[75] Inventors: James C. Collard; Wesley G. Martin, both of Manitowoc, Wis.

[73] Assignee: Kraft, Inc., Glenview, Ill.

[21] Appl. No.: 849,868

[22] Filed: Nov. 9, 1977

[51] Int. Cl.² ............................................. F16B 9/02
[52] U.S. Cl. .................................. 403/254; 403/316; 46/28
[58] Field of Search ............... 403/354, 347, 230, 315, 403/316, 353, 346, 254, 247; 46/26, 29, 28

[56] References Cited
U.S. PATENT DOCUMENTS 2,242,078   5/1941   Kimball ................................ 403/316

FOREIGN PATENT DOCUMENTS 995,428   6/1965   United Kingdom ..................... 403/353

*Primary Examiner*—Andrew V. Kundrat
*Attorney, Agent, or Firm*—Fitch, Even, Tabin & Luedeka

[57] ABSTRACT

A releasable coupling of the type having interlocking elements wherein two structural components can be joined in interconnection to one another. The releasable coupling includes a structural member having a pair of opposed channels separated by a web. A pair of lugs is provided at one end of an end wall member for engagement with a slot in a receiving member. A recess is locked at one end of the slot for receiving the lugs when the structural member is engaged with the pair of channels.

5 Claims, 18 Drawing Figures

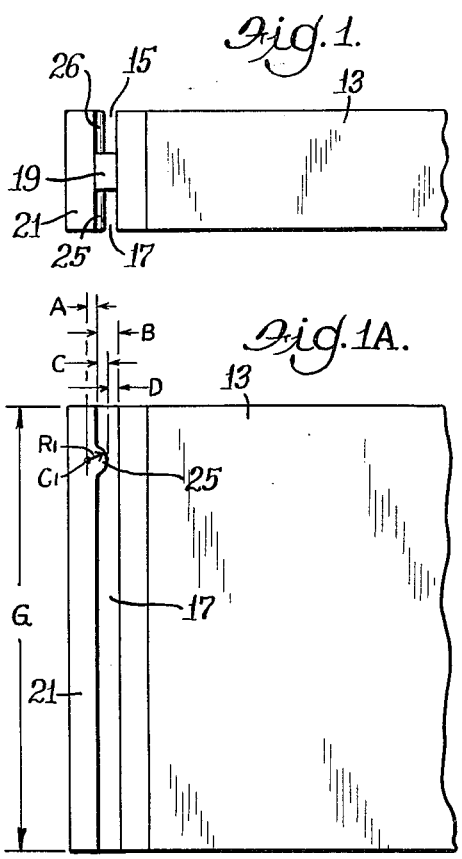
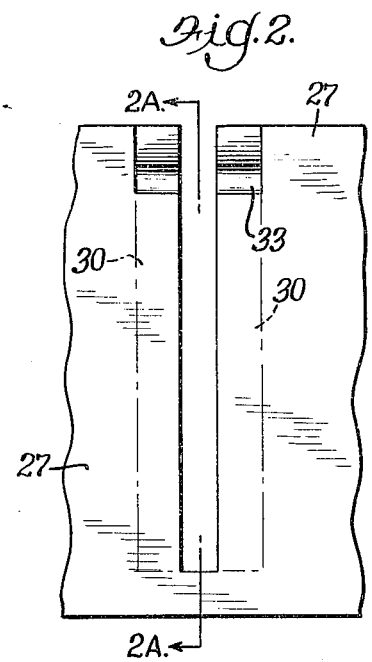
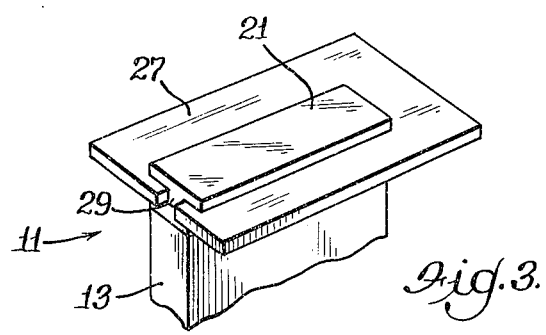
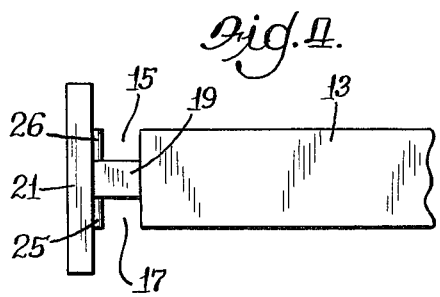
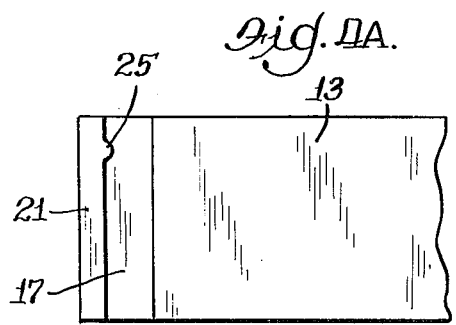
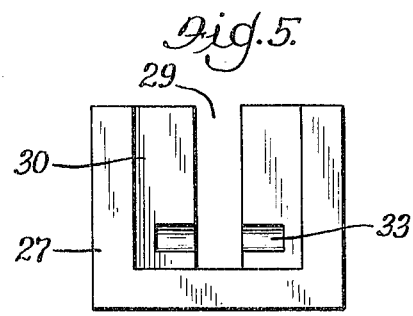
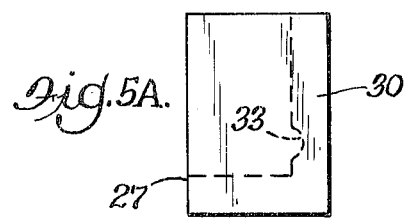

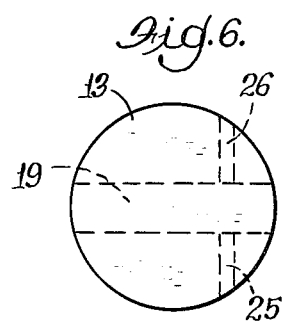
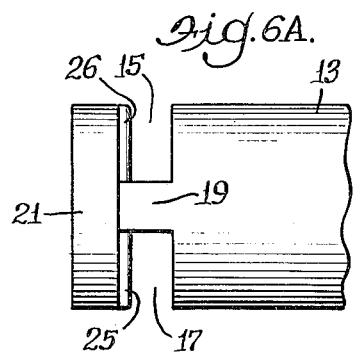
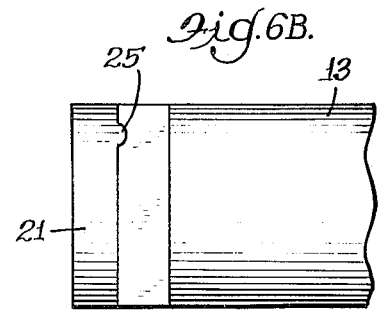
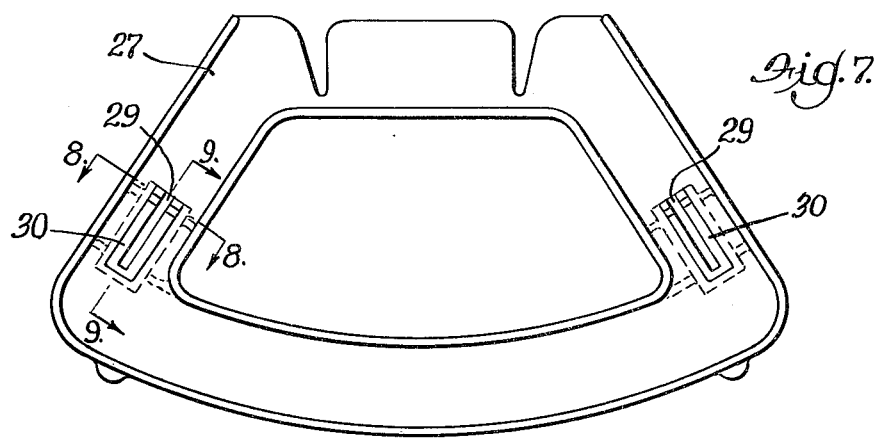
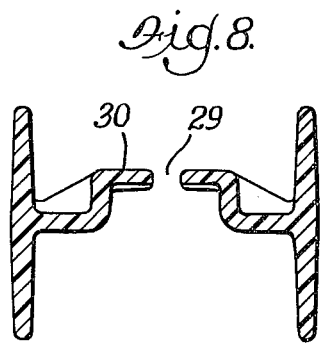
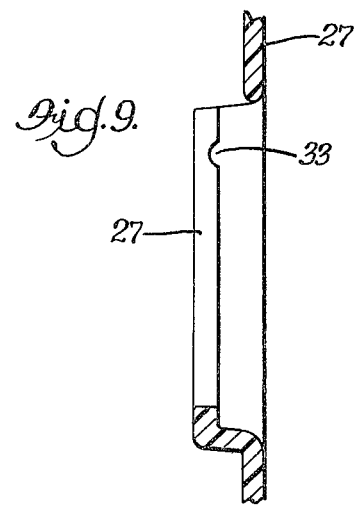
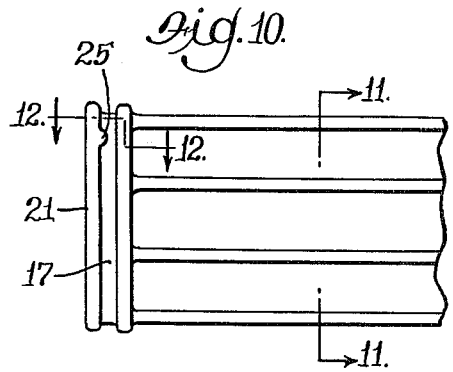
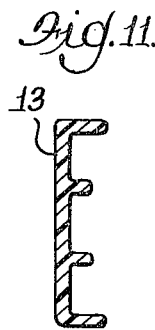
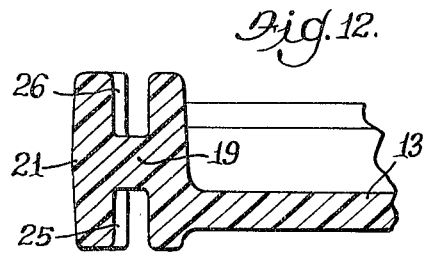

RELEASABLE COUPLING

The present invention relates generally to releasable couplings and more particularly relates to a releasable coupling for joining two or more structural members in detented interconnection at right angles to one another.

A principal object of the present invention is to provide a novel and improved releasable coupling of the type having interlocking elements wherein two structural members can be joined in interconnection at right angles to one another.

Another object of the invention is to provide an improved releasable coupling for structural members wherein certain fits can be tolerated between the structural members at a high degree of rigidity and lack of looseness can be obtained when the structural members are assembled.

A further object of the invention is to provide an improved releasable coupling which is assembled by the simple act of sliding one member containing a slot into a receiving channel of another member.

A still further object of the invention is to provide an improved releasable coupling wherein a strong and positive connection is effected between at least two planar structural members yet release may be accomplished by relatively large effort or force which is exerted in the direction which tends to separate the parts.

Other features of the invention reside in the provision of an improved releasable coupling which involves relatively simple construction, the structures being economical to fabricate, reliable and relatively fullproof in operation.

Other features and advantages become more apparent from the following detailed description and the accompanying drawings wherein:

FIG. 1 and FIG. 1A are a top view and side view, respectively, partially broken away of a structural member as provided by the invention;

FIG. 2 and FIG. 2A are front view and side view respectively, of a receiving member as provided by the invention for interconnection with the structural member of FIG. 1;

FIG. 3 is a perspective view showing the structural member of FIG. 1 joined in interconnecting relationship with the receiving member of FIG. 2;

FIG. 4 and FIG. 4A are a top view and side view, respectively, of a further embodiment of the structural member of the invention;

FIG. 5 and FIG. 5A are a front view and side view, respectively, of a further embodiment of the receiving member of the invention;

FIG. 6, FIG. 6A and FIG. 6B are an end view, top view and side view, respectively of a further embodiment of the receiving member of the invention;

FIG. 7 is a side view of a structural component utilizing a further embodiment of the receiving member of the invention;

FIG. 8 is a cross-sectional view taken along the line 8—8 of FIG. 7;

FIG. 9 is a cross-sectional view taken along the line 9—9 of FIG. 8;

FIG. 10 is a side view of a structural component of a further embodiment of the structural member of the invention;

FIG. 11 is a cross-sectional view taken along the line 11—11 of FIG. 10;

FIG. 12 is a top view taken along the line 12—12 of FIG. 10.

Referring first to FIGS. 1-3, the releasable coupling is shown in assembled condition generally at 11. The releasable coupling comprises a structural member designated generally by the numeral 13, said structural member having a first channel 15 and a second channel 17 to form a pair of opposed channels separated by a web 19. The outermost wall of each of the first and second channels is formed by an end wall member 21. End wall member 21 is affixed to the web 19 by any suitable means, such as glue or at least two screws. Structural member 13 can be formed as an integral single piece as further described hereinbelow in the discussion of FIGS. 10-12. Lugs 25 and 26 are provided at one end of end wall member 21 for engagement with a recess or slot in receiving member 27. Structural member 13, regardless of construction, is designed to prevent any substantial displacement of the end wall member 21 during engagement with receiving member 27.

Receiving member 27 has an elongated slot 29 which engages first and second channels 15 and 17. Receiving member 27 has a zone of thickness 30 (shaded area of FIG. 2) adjacent the elongated slot 29 which is less than the thickness of the first channel and second channel. The zone of thickness 30 may be spaced from the main body of the receiving member, as shown in FIGS. 7-10. Recess 33 is located at one end of slot 29 for receiving lugs 25 and 26 when receiving member 27 is engaged with the first channel and second channel.

The relationships between various dimensions of the structural member 13 and receiving member 27 are important to achieve the benefits of the invention. These benefits include providing a releasable coupling which can be easily assembled but which requires relatively high force to disassemble. The releasable coupling of the invention can be assembled by a child but requires the greater strength and agility of an adult to separate.

The important dimensional features are designated by the letters A thru G, $R_1$, $R_2$, $C_1$ and $C_2$ in FIGS. 1 and 2. A description of the various dimensions is set forth hereinbelow in Table I.

Table I

| Letter | Description |
| --- | --- |
| $R_1$ | Radius of curvature of lugs 25 or 26 |
| $C_1$ | Center of curvature of lugs 25 or 26 |
| $R_2$ | Radius of curvature of recess 33 |
| $C_2$ | Center of curvature of recess 33 |
| A | Offset distance of $C_1$ |
| B | Width of channel 15 or 17 |
| C | Extent of intrusion of lug 25 or 26 into channel 15 or 17 |
| D | Clearance in channel 15 or 17 between lug 25 or 26 and channel wall |
| E | Offset distance of C |
| F | Width of zone of thickness of receiving member 27 adjacent channel 15 or 17 |
| G | Length of channel 15 and 17 |

At least one of the end wall member 21 or the receiving member 27 must be constructed of a substantially rigid, resilient, slightly compressible material. The term "resilient compressible material" is meant to include all those materials which are capable of being slightly compressed and which return to their original shape after the compression. Suitable resilient materials include but are not limited to plastics; such as polystyrene, polyethylene, polypropylene, polytetrafluoroethylene, polyurethane, polyacrylates, polyamides; wood and leather. Unsuitable materials are metals, glass and paper products. In a preferred embodiment, both the end wall member 21 and the receiving member 27 are constructed of a resilient material.

In operation, the elongated slot 29 of receiving member 27 are centered around web 19. The width F of the receiving member is less than the width B of the channels 15 or 17 in a zone adjacent the channels. As the elongated slot is first engaged in the channel there is substantial clearance and a loose fit between the receiving member and the channels. As the elongated slot is moved through the channels the fit becomes tighter because of a fulcrum effect between the point at the entrance of the channels and the end of the slot. The elongated slot eventually reaches lugs 25 and 26. Since the width F of the receiving member in the zone adjacent the slot is greater than the clearance D in the channel 15 or 17 between the lug 25 or 26 and the channel wall, the receiving member and/or the lug must be compressed to permit further engagement of the slot and the channel. As receiving member 27 is pushed further through the first and second channel, the recess 33 provided in receiving member 27 eventually receives lugs 25 and 26 in a detent relationship. Thus, receiving member 27 is then engaged with structural member 13 in detented interconnection at right angles thereto. The required relationships between the various dimensions set forth in Table I to accomplish the purposes of the invention are set forth hereinbelow in Table II, all dimensions being in the same units.

Table II

| Dimension | Requirement |
| --- | --- |
| $R_1$ | [.50 – 1.0] B |
| $C_1$ (A) | [.25 – .75] $R_1$ |
| G | [10 – 25] B |
| $R_2$ | $R_1 \pm .05\ R_1$ |
| $C_2$ (E) | [.35 – .85] $R_2$ |
| C | [.30 – .40] B |
| F | D + [.05 – .20] D |
| $C_2$ (E) | $C_1$ (A) + [.10 – .50] $R_1$ |

A further embodiment of structural member 13 is set forth in FIG. 4. As shown in FIG. 4, the end wall member 21 is elongated with respect to the thickness of structural member 13. The lugs 25 are located adjacent web 19 and do not extend the full width of the end wall member 21. The end wall member 21 has an elongated width which extends beyond the entrance of first channel 15 and second channel 17. The elongated width provides additional stability when the structural member 13 and receiving member 27 are engaged.

It should be understood that the thickness of end wall member 21 or receiving member 27 is not critical. End wall member 21 needs to be only thick enough to provide a substantially rigid sidewall construction for first and second channels 15 and 17. As shown in FIG. 5, the receiving member 27 can be any thickness and can be adapted to use any thickness of end wall member 21. As shown in FIG. 5, the zone adjacent elongated slot 29 is relieved to accept the end wall member 21.

As shown in FIG. 6, structural member 13 can be cylindrical in shape.

The engagement of receiving member 27 in each of the first channel and second channel on each side of web 19 results in providing a rigid structure with substantially little tendency for sidewise or longitudinal play. The structure provided is adaptable to the use of multiple connections. In particular, the structural member 13 can be provided with a secondary set of channels and end wall member construction at the opposite end thereof to provide an assembly adapted to tie two or more structural members together.

FIGS. 1–6 generally define the concepts of the present invention. FIGS. 7–12 set forth a detailed structure utilizing these concepts. The receiving member 27 of FIG. 7 and the structural member 13 of FIG. 10 are injection molded from high impact polystyrene. Two of the structural members are joined with two of the receiving members to provide a sub assembly for use in assembly of a rocker for doll furniture.

The various dimensions of the structural member 13 and receiving member 27 are set forth hereinbelow in Table III.

Table III

| Dimension | Specification - Inches (To Sharps Where Appropriate) |
| --- | --- |
| $R_1$ | .062 |
| $R_2$ | .062 |
| A | .031 |
| B | .085 |
| C | .031 |
| D | .054 |
| E | .031 |
| F | .062 |
| G | 1.50 |

Variations and modifications may be made within the scope of the claims and portions of the improvement may be used without others. In particular, the description of various features may be used in combination without resort to the use of various other features described in connection with the releasable coupling invention.

What is claimed is:

1. A releasable coupling for joining two or more structural components in detented interconnection to one another comprising
    (a) a structural member having a first side wall and a second side wall;
    (b) at least one channel in each of said first and said second side walls to form a pair of opposed channels separated by a web adjacent an end of said structural member;
    (c) the outermost wall of said channels being formed by an end wall member;
    (d) at least one lug located at one end of at least one of said channels;
    (e) a receiving member having an elongated slot; and
    (f) a recess formed adjacent one end of said slot for receiving said lug in detented releasable connection by sliding said slot through said pair of channels;
    said end wall member being affixed to said structural member in a manner so that there is no substantial displacement of said end wall member being engaged with said slot of said receiving member.

2. A releasable coupling in accordance with claim 1 wherein said end wall and said web of said structural member are formed from a single integral piece.

3. A releasable coupling in accordance with claim 1 wherein at least one of said end wall member having said lug and said receiving member are formed from a resilient compressible material.

4. A releasable coupling in accordance with claim 3 wherein said resilient compressible material is selected from the group consisting of polystyrene, polyethylene, polypropylene, polytetrafluoroethylene, polyurethane, polyacrylates, polyamides, wood and leather.

5. A releasable coupling in accordance with claim 1 wherein the dimensional relationship of the dimensions of said structure member and said receiving member as set forth in FIGS. 1A and 2A are in accordance with the following:

| Dimension | Requirement |
|---|---|
| $R_1$ | $[.50 - 1.0]$ B |
| $C_1$ (A) | $[.25 - .75]$ $R_1$ |
| G | $[10 - 25]$ B |
| $R_2$ | $R_1 \pm .05$ $R_1$ |
| $C_2$ (E) | $[.35 - .85]$ $R_2$ |
| C | $[.30 - .40]$ B |
| F | D + $[.05 - .20]$ D |
| $C_2$ (E) | $C_1$ (A) + $[.10 - .50]$ $R_1$ |

* * * * *

UNITED STATES PATENT AND TRADEMARK OFFICE
CERTIFICATE OF CORRECTION

PATENT NO. : 4,108,562
DATED : August 22, 1978
INVENTOR(S) : James C. Collard and Wesley G. Martin It is certified that error appears in the above-identified patent and that said Letters Patent are hereby corrected as shown below:

In Column 2, Table 1, line 52, "E  Offset distance of C"

should be --E  Offset distance of $C_2$--

Signed and Sealed this

Seventeenth Day of July 1979

[SEAL]

Attest:

Attesting Officer

LUTRELLE F. PARKER
*Acting Commissioner of Patents and Trademarks*